United States Patent [19]

Kovalovsky

[11] 4,352,474
[45] Oct. 5, 1982

[54] DRAG CONTROL FOR FISHING REELS

[76] Inventor: Oscar Kovalovsky, 11154 Debby St., North Hollywood, Calif. 91606

[21] Appl. No.: 229,937

[22] Filed: Jan. 30, 1981

[51] Int. Cl.³ .............................................. A01K 89/02
[52] U.S. Cl. .................................. 242/218; 242/219; 242/84.5 R
[58] Field of Search ............... 242/211, 212, 213, 214, 242/215, 216, 217, 218, 219, 220, 221, 84.5 R, 84.51 R

[56] References Cited

U.S. PATENT DOCUMENTS

| | | | |
|---|---|---|---|
| 2,298,481 | 10/1942 | Hayes | 242/84.5 R |
| 2,316,314 | 4/1943 | Burdick | 242/84.5 R |
| 2,981,495 | 4/1961 | King | 242/213 |
| 3,478,977 | 11/1969 | Sarah | 242/219 |
| 3,806,060 | 4/1974 | Valentine | 242/215 |

FOREIGN PATENT DOCUMENTS 437166 10/1935 United Kingdom ............... 242/217

Primary Examiner—Billy S. Taylor
Attorney, Agent, or Firm—Roger A. Marrs

[57] ABSTRACT

A fishing reel of the fly fishing type is disclosed herein having a supporting frame provided with a stub shaft for rotatably mounting of a ratchet shaft having a toothed flange carried on one end. A fishing line storage spool is carried on the ratchet shaft by a pair of ball bearing assemblies. A crank plate is releasably secured to the end of the ratchet shaft so that the spool may be manually rotated by a winding crank fixed to the crank plate. A security locking mechanism holds the crank plate to the ratchet shaft. A friction-disc is disposed between the opposing surfaces of the toothed ratchet flange and spool while a drag adjuster mechanism is operably carried on the winding crank and is adapted to selectively engage with the spool for moving the spool into frictional engagement with the friction disc.

8 Claims, 6 Drawing Figures

DRAG CONTROL FOR FISHING REELS

BACKGROUND OF THE INVENTION

1. Field of the Invention

The present invention relates to fishing reels of the casting type and more particularly to an improved reel for use in rod and fly fishing which includes improved means for providing adjustable drag which may be readily positioned in such a manner as to conveniently facilitate any instant infinite changeability as may be desired during excitement of catching a fish.

2. Description of the Prior Art

In the past, a variety of drag assemblies have been employed in fishing reels which are utilized to exert a braking force on the fishing line spool and therefore, the fisherman is assisted in controlling the play of the fish. These drag assemblies frequently require the fisherman to hold the rod and reel assembly in an unusual or unnatural fashion, or sometimes, may require the preparation of a complex system which is heavy and relatively difficult to assemble and service. Furthermore, additional difficulties and problems have been encountered with conventional fly fishing reels which stem largely from the fact that such reels are equipped with drag assemblies that tend to grip the spool tightly and thus exert unusual or heavy forces on the line, thereby risking breaking of the line.

Most conventional drag assemblies do not provide for a positive, constant means capable of applying the necessary drag or friction. Since it is necessary to apply physical pressure to the winding knob, unevenness of the drag would be disasterous and, certainly, limits of strength are also encountered. There is a definite lacking in prior art drag mechanisms associated with fly casting reels which provides a drag or breaking system with a spool having quick changeability of the spools. Sometimes a fisherman may use many types of fly lines and without removing the line from one spool, the usual practise is to quickly change to another spool containing the desired line. A considerable number of conventional adjustable drag fly reels have the breaking arrangement located in the hub of the spool. Most of these prior reels are not designed for quick changing of the spool and require special tools for the change operation. In other instances, the removal of the spool is achieved with the complete breaking system intact which means that each and every extra spool must have its own complete breaking mechanism included which is costly and burdensome.

Therefore, a long standing need has existed to provide a fly fishing reel of the casting type which provides a drag mechanism permitting a wide variety of forces to be applied to the line spool along with breaking force being directly proportional to the finger pressure exerted by the fisherman upon the drag assembly and which permits for ready interchangeability of spools.

SUMMARY OF THE INVENTION

Accordingly, the above problems and difficulties are obviated by the present invention which provides for a novel drag adjusting means for applying tension to an out-going spool of line and in which the paying out of the line from the spool may be suitably retarded in accordance with different requirements of fishing practise. The means includes a drag adjuster which is positioned in such a manner as to conveniently facilitate any instant infinite changeability as may be desired during the procedure of catching fish. This means includes a frame and ratchet means for movably supporting a spool so as to rotate in a single direction. A drag means is provided which includes a crank plate carrying a finger controlled friction pad coaxially disposed with respect to a winding crank immediately adjacent the outer periphery of the spool. A friction disc is provided between opposing surfaces of the ratchet means and the spool so that the spool moves laterally into engagement with the friction disc in response to forcible engagement of the pad with the opposite side of the spool.

Therefore, it is among the periphery objects of the present invention to provide a novel drag control for fishing reels of the casting type which provides a drag means for applying pressure at a point adjacent the periphery of the spool so that greater efficiency will result with less physical effort required for any given amount of retardation.

Another object of the present invention is to provide a novel adjustable drag control for fishing reels wherein the applied braking pressure is concentrated on a small area in relation to the contact circumference of the line spool which results in a desirable lapse of time in the rotation of the spool before that particular spot is again burdened with the pad pressure.

Still another object of the present invention is to provide a novel adjustable drag control which does not provide a continuous circular friction piece whereby a cooling effect of the un-pressured area is achieved by utilizing a friction pad of small area.

Still a further object of the present invention is to provide a novel drag adjuster for fishing reels which will readily permit spool interchangeability and which is relatively economic to manufacture.

A further object of the present invention is to provide a novel fishing reel which includes a frictional drag means that is readily assembled and disassembled and which does not require skill on the part of the user for assembly and disassembly.

Another object resides in the provision of a novel drag control which through a ratchet mechanism, only drag against the fish is experienced and not against the user in the wind-in direction.

BRIEF DESCRIPTION OF THE DRAWINGS

The features of the present invention which are believed to be novel are set forth with particularity in the appended claims. The present application, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
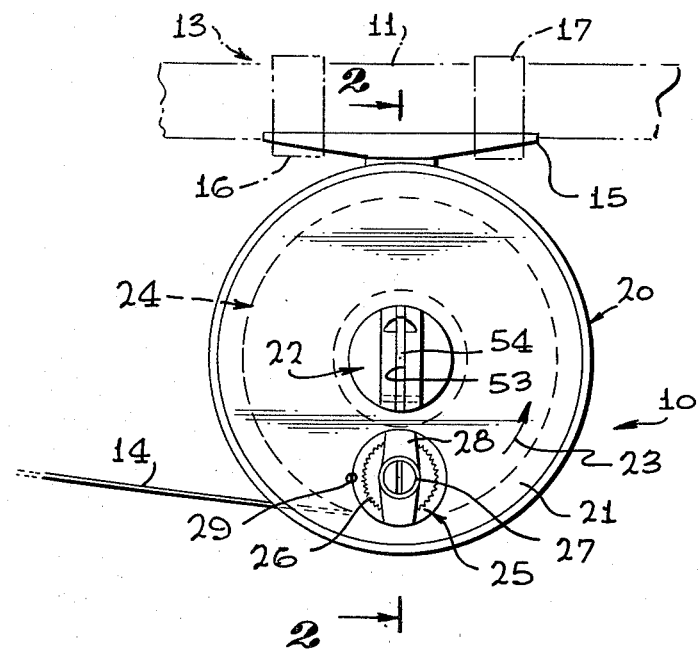
FIG. 1 is a side elevational view of a fishing rod having the novel fishing reel incorporating the present invention mounted thereon.

Referring to FIG. 1, like reference numerals refer to like parts in the different figures of the drawing. The improved fly fishing reel is indicated in general in the direction of arrow 10 and is illustrated in a conventional operational manner as being attached to the butt or handle portion 11 of a fishing rod 13. Also, as is conventional, a fishing line 14 is illustrated extending from its storage position on the reel 10 and outwardly extending through a series of guides carried on the rod 13. For mounting purposes, the reel includes a base 15 which is releasably clamped onto the handle 11 by means of suitable clamps 16 and 17 which is of conventional design.

The reel 10 includes a frame 20 which carries the base 15 and houses the various components of the reel which includes a crankplate 21 which is maintained in place by a security locking mechanism indicated in general by the numeral 22. The crank plate 21 may be selectively rotated in the direction of arrow 23 when it is desired to reel the fishing line 14 into the storage configuration on a spool 24. A drag adjuster mechanism is indicated in general by numeral 25 which is employed to selectively apply a braking action to the spool for adjusting the tension on the line 14. Adjustment of the drag mechanism is achieved by rotating a finger knob 26 which is coaxially disposed with respect to a winding knob 27 carried near the edge marginal region of the periphery of the crankplate 21. The winding knob 27 is rotatably carried on a yoke member 28 which is fixed to the crankplate 21 by a suitable threadable arrangement and which is secured by a set screw 29.

Figure 2:
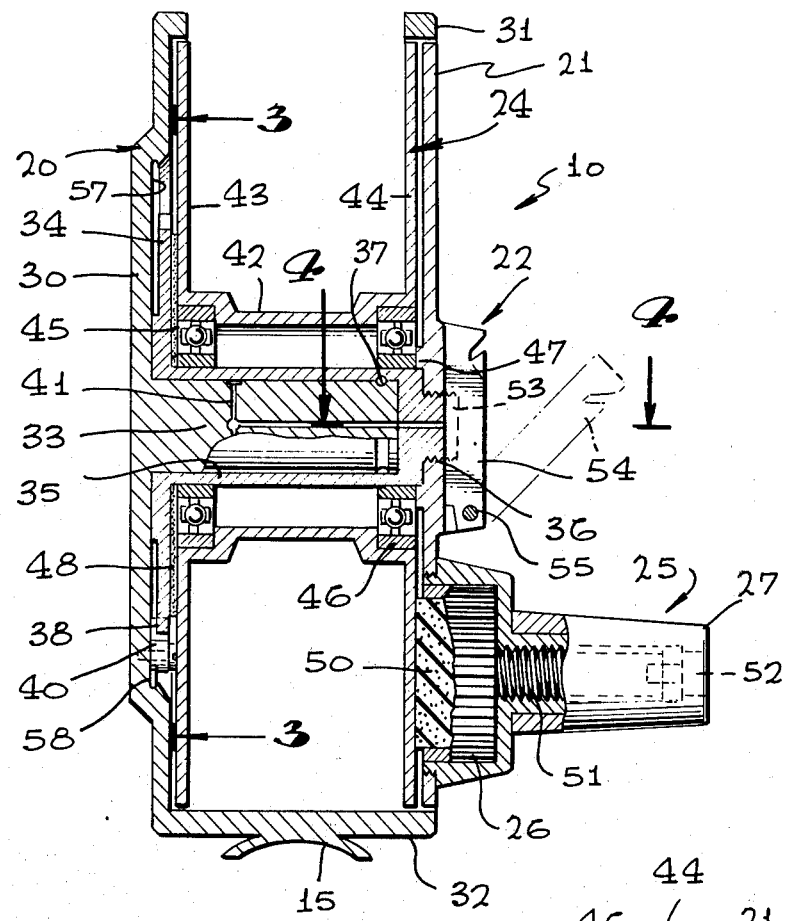
FIG. 2 is a transverse cross sectional view of the fishing reel shown in FIG. 1 as taken in the direction of arrows 2—2 thereof.

Referring now in detail to FIG. 2, it can be seen that the frame 20 takes the form of a cage having a plate 30 on one side and a ring 31 on the opposite side arranged in fixed spaced apart relationship from the plate 30 by means of spacers such as spacer 32. Projecting into the area between the plate 30 and ring 31, there is provided a stub shaft 33 integrally formed with the plate 30 on which is mounted a ratchet mechanism taking the form of a ratchet ring 34 having a ratchet shaft portion 35 which terminates in a threaded portion 36. The threaded portion 36 is intended to threadably engage with a central hole on the crankplate 21. The ratchet shaft 35 includes a bore into which the shaft stub 33 is introduced and retained thereon by means of a pin and groove 37. The ratchet plate 34 is provided with a plurality of ratchet teeth, such as tooth 38 along its peripheral edge and these teeth are engaged by a pair of pawls such as indicated by numeral 40, 40'. It should also be noticed that the stub shaft 33 includes a plurality of grooves and holes for conducting lubricating fluid therethrough. Lubricating grooves or passageways are indicated in general by the numeral 41.

The spool 24 includes a central hub 24 having side flanges 43 and 44 integrally connected on opposite sides thereof. In practise, the hub 42 stores the fishing line between the opposing surfaces of flanges 43 and 44. The spool 24 is rotatably carried on the ratchet shaft 35 by means of ball bearing assemblies 45 and 46. It is to be particularly noted that the inside surface of the crankplate 21 includes a circular shoulder 47 which is in direct engagement with the ratchet shaft 35 so that the rotary movement of the crankplate 21 is transferred to the ratchet mechanism. Disposed between the opposing surfaces of the ratchet plate 34 and the exterior surface of spool flange 43 there is provided a friction disc 48 which is employed in the braking procedure for controlling the tension on the line 14. The friction disc 48 works in cooperation with a friction pad 50 carried on the finger knob 26 of the drag adjuster mechanism 25. The pad 50 bears against the external surface of the flange 44 when the knob 26 is rotated so that the spool 24 moves slightly in a lateral direction so as to bear directly against the friction disc 48. In this manner, control of tension is directly under the direction of the user's fingers via knob 26. Inasmuch as knob 26 is adjacent to the winding knob 27, the user's hand need not be removed from the winding knob in order to adjust tension. The tension knob 26 is carried on a threaded shaft 51 which is in threaded engagement with a central bore mounting knob 27. A screw 52 is employed for mounting the knob 27 to the shaft 51.

Figure 4:
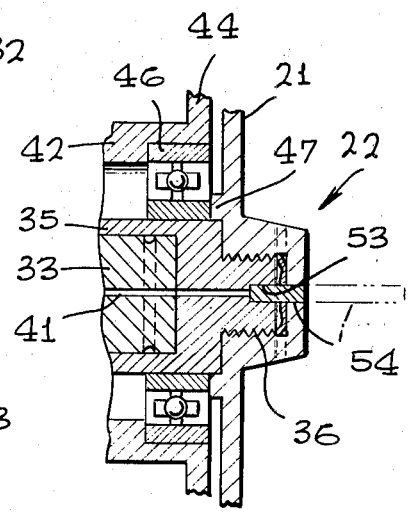
FIG. 4 is an enlarged fragmentary view, in section, illustrating the security locking mechanism employed in the reel shown in FIG. 2 as taken in the direction of arrows 4—4 thereof.

The security locking mechanism 22 is shown more clearly in FIG. 4 where it can be seen that the terminating end of the threaded ratchet shaft portion 36 is provided with a slot 53 into which a lever 54 is insertably received. The lever 54 is pivoted to the mechanism structure by means of a pivot 55 shown in FIG. 2. In solid lines, the lever 54 is inserted into the slot 53 in order to prevent against rotation of the crankplate 21 with respect to the ratchet shaft 35. It is also to be noted that the threads may be either right hand or left hand threads depending on whether or not the reel is right handed or left handed. For example, the threads are of a left hand helix for a left hand reel. When it is desired to change spools, the lever 54 is moved to the position shown in broken lines in both FIGS. 2 and 4 and the crankplate is then unthreaded from its connection on the ratchet shaft portion 36. Since the drag adjuster mechanism is carried on the crankplate, the entire assembly is removed and the spool is free to be slid from the ratchet shaft.

Figure 3:
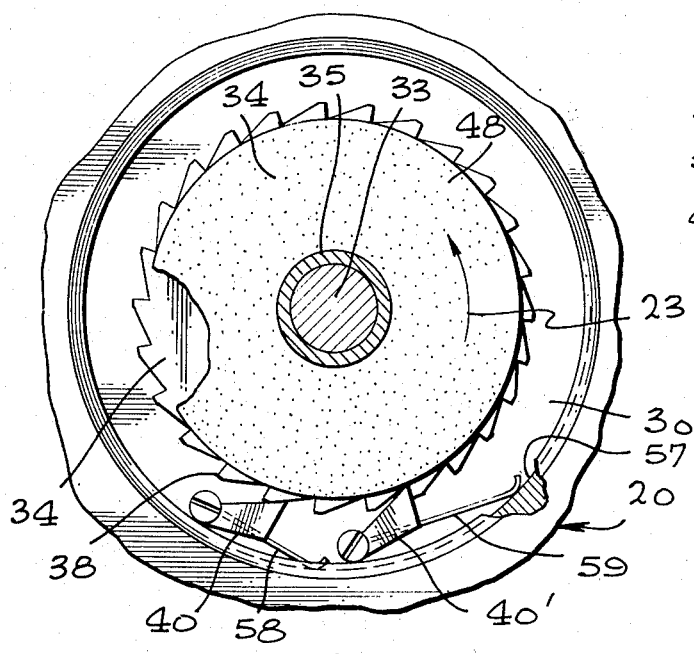
FIG. 3 is a sectional view showing the ratchet means incorporated into the reel shown in FIG. 2 as taken in the direction of arrows 3—3 thereof.

Referring now in detail to FIG. 3, it can be seen that the frame 20 includes a recess to accommodate the ratchet plate 34 and a circular groove, as noted in FIG. 2 by numeral 57, is provided for accommodating the thickness and mounting of a pair of springs 58 and 59. Each of the pawls are spring biased into contact and engagement with the series of ratchet teeth 38 by means of leaf springs 58 and 59 respectively. One end of each spring is connected to a the pawls while the opposite end of the spring is formed with a rounded terminating end that bears against the inside of the groove 57. Therefore, the ratchet assembly including the plate, shaft and ratchet teeth can only move in a counterclockwise direction indicated by the arrow 23.

Figure 6:
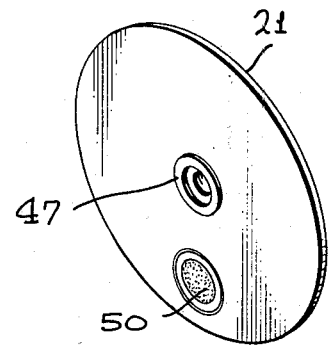
FIG. 6 is a perspective view of the crankplate used in the reel of FIGS. 1-5 and illustrating the pressure pad carried thereon.
Figure 5:
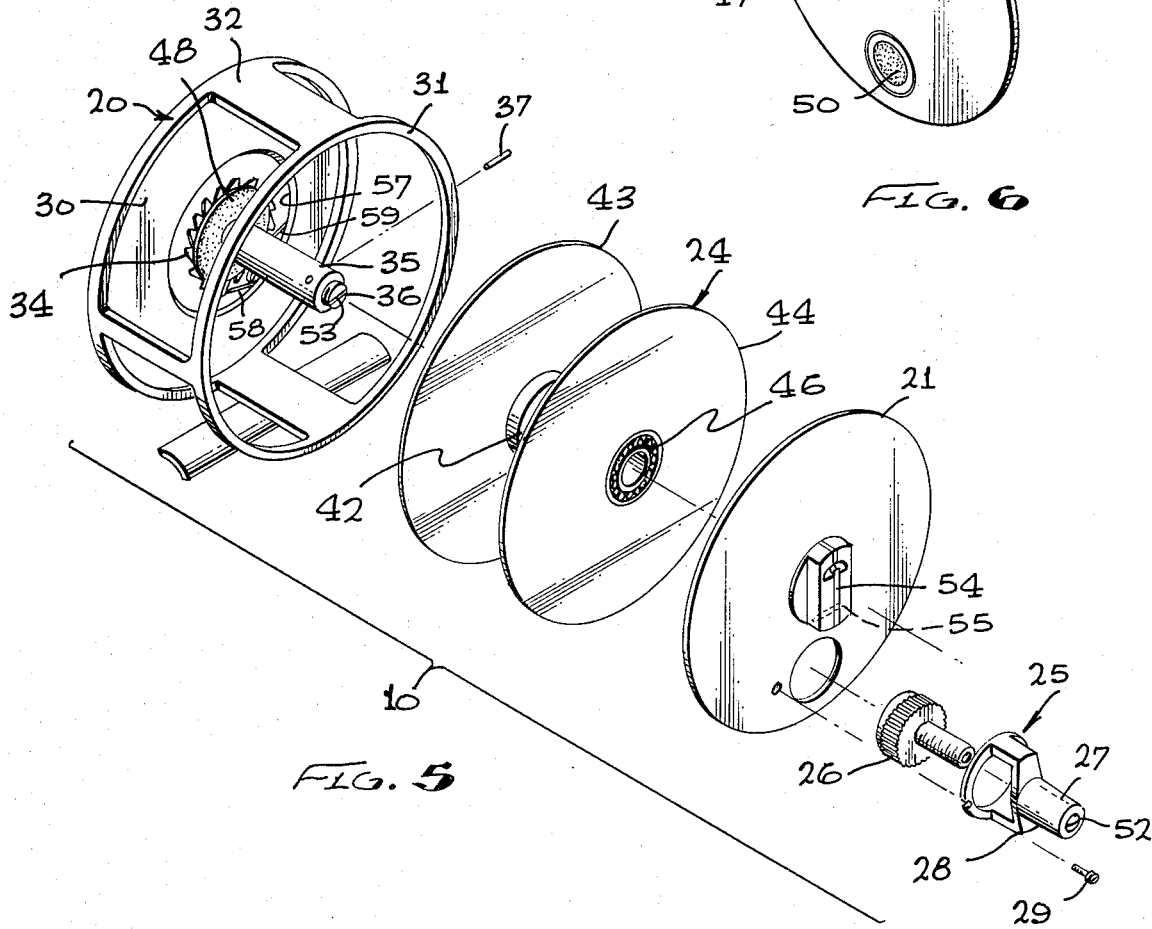
FIG. 5 is an exploded view in perspective, showing the arrangement of parts prior to assembly.

Referring now to FIG. 5, the novel fishing reel of the present invention is shown in an exploded view to more precisely clarify the positioning of the major assemblies. It can be seen that the winding mechanism including knob 27 is carried along the edge marginal region adjacent to the periphery of the crankplate 21 so that the friction pad 50, shown in FIG. 6, is directly applied to a corresponding edge marginal region on the exterior surface of flange 44 of the spool 24. Also, it can be understood that the fingers of the user need only rotate knob 26 to apply the pad against the spool. The spool will then be forcibly urged into frictional engagement with the friction disc 48 carried on the frame 20 via the ratchet assembly and the tension of line 14 carried on the spool is controlled thereby. Furthermore, FIG. 5 further emphasizes the fact that the spool 24 is carried on ball bearing assemblies 45 and 46 so that free rotation of the spool is relatively uninhibited or retarded. Inasmuch as the applied breaking pressure is concentrated on a small area in relation to the contact circumference of the spool flange, there is a desirable lapse of time in the rotation of the spool flange before that particular location is again burdened with the pad 50 pressure. Inasmuch as there is not a continuous circular friction piece employed, but merely a small pad 50, a cooling effect of the unpressured area is achieved. Furthermore, since the applied pressure is near the peripheral edge of the flange, more efficiency results with less physical effort being necessary for any given amount of retardation. In the present instance, only two fingers of the user are necessary to apply pressure via knob 26 and pressure pad 50. The drag adjuster 25 is positioned in such a manner as to conveniently facilitate any instant infinite changeability as may be desired during the procedure of catching a fish.

With the inventive drag adjusting unit, it can be understood that during the act of catching a fish, which usually brings about a high rate or state of excitement, the user can be winding in line with his fingers on the winding knob 27 or quickly shift his fingers to the adjacent drag adjuster knob 26 for applying more or less drag as desired, without having to grope for an adjuster located inconveniently away from the winding knob. Such inconvenience may cost the fisherman the loss of a prized quarry. By employing the security lock mechanism 22, the crankplate 21 is key-locked to the ratchet shaft 35 preventing unintentional loosening of the crankplate during normal use; however, the key lever 54 may be advanced out of its associated slot 53 in the event it is desired to dismantle the reel by removing the crankplate 21.

From the foregoing, it is understood that when the friction pad 50 on the crankplate 21 is adjusted to bear against the one side of the spool flange 44, the spool is free to move laterally, whether rotating or not, and the opposite flange 43 of the spool will make contact with the friction disc 48 bearing against the ratchet flange. By this, it can be noted that the two friction pieces clutch the spool flanges and enable the spool to be driven in a wind-in direction of line recovery through the crankplate and ratchet shaft via the winding knob 27. During this direction of operation, the two ratchet pawls 40 and 40' allow the ratchet shaft 35 to rotate. However, when the fish overpowers the amount of applied drag set by the adjuster 26, the spool immediately reverses direction which in return reverses the direction of the ratchet shaft. Due to the pawls engaging the ratchet teeth, further rotation in that direction is stopped. Hence, the spool 24 then rotates on its own bearings 45 and 46 as the fish pulls the line from the spool at whatever pressure or drag the adjuster mechanism 26 is tensioned at. At the same time, the ratchet shaft is being prevented from rotating, the crankplate 21 is also prevented from rotating due to its being fastened and keyed to the ratchet shaft.

It should be further noted that since the crankplate 21 is fastened to the ratchet shaft near its center, and that the drag adjuster mechanism 25 is near the extreme diameter of the crankplate, there is a desirable flexing or tortional effect attained due to a specific thickness of crankplate 21 to allow the adjuster pad to exert the pressure or drag against the spool with a cushioned effect.

Additionally, the inventive fishing reel of the present invention lends itself to a clean, smoothly made product having no outwardly projections, which could foul the line during the casting motions. The drag adjuster mechanism and the locking device are simple and positive arrangements having but few parts which lend itself to low cost production methods.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A fishing reel of the fly casting type comprising:
a frame having a stub shaft outwardly projecting from the center of a plate;
a ratchet member movably carried on said stub shaft including a ratchet shaft coaxially disposed on said stub shaft and a plurality of ratchet teeth provided along the periphery of said ratchet member;
at least one pawl operably carried on said frame plate adapted to engage with said ratchet teeth so as to allow rotation of said ratchet member in a predetermined direction;
a spool for holding a length of fishing line;
a friction disc disposed on said ratchet shaft between said ratchet member and said spool;
bearing means carried on said ratchet shaft for rotatably supporting said spool thereon;
a crank plate fixed to a selected end of said ratchet shaft;
a winding knob rotatably carried on said crank plate in close proximity to its peripheral edge;
a drag adjuster mechanism rotatably carried on said crank plate coaxially disposed with respect to said winding knob; and
a friction pad fixed on said drag adjuster mechanism for bearing against said spool adjacent its outer peripheral edge to forcibly urge said spool into retarded frictional engagement with said friction disc so as to place a desired tension on said fishing line during a fish catching procedure.

2. The invention as defined in claim 1 wherein:
said drag adjuster mechanism includes a knurled knob of greater diameter than the diameter of said winding knob.

3. The invention as defined in claim 2 wherein:
said drag adjuster mechanism includes a yoke mount for supporting said drag adjuster knob and said winding knob in coaxial relationship so that either knob may be rotated by the fingers of the same hand.

4. The invention as defined in claim 3 wherein:
said friction pad is provided with a diameter dimension smaller than the diameter dimension of said friction disc.

5. The invention as defined in claim 4 wherein:
said stub shaft is provided with an annular groove; and
a retaining pin is insertably disposed through said ratchet shaft into said groove for retaining said ratchet shaft onto said stub shaft.

6. The invention as defined in claim 5 including:

a security lock mechanism releasably joining said crank plate to said ratchet shaft so that said ratchet shaft and said crank plate move as a unitary construction.

7. The invention as defined in claim 6 wherein: said security lock mechanism includes a housing threadably engaged with said selected end of said ratchet shaft;

said selected end having a slot provided therein; and a latch pivotally carried on said housing selectively engagable with said slot to releasably secure said crank plate to said ratchet shaft.

8. The invention as defined in claim 7 wherein:

said spool is free-rotating on said ratchet shaft when said friction pad is disengaged with said spool.

* * * * *